US011428432B2

(12) United States Patent
Gervais et al.

(10) Patent No.: US 11,428,432 B2
(45) Date of Patent: Aug. 30, 2022

(54) COMPUTING DEVICE AND METHOD FOR INFERRING AN AIRFLOW OF A VAV APPLIANCE OPERATING IN AN AREA OF A BUILDING

(71) Applicant: Distech Controls Inc., Brossard (CA)

(72) Inventors: Francois Gervais, Lachine (CA); Dominique Laplante, St-Dominique (CA); Carlo Masciovecchio, St-Isidore-de-Laprairie (CA); Jean-Simon Boucher, St-Hubert (CA)

(73) Assignee: Distech Controls Inc., Brossard (CA)

( * ) Notice: Subject to any disclaimer, the term of this patent is extended or adjusted under 35 U.S.C. 154(b) by 817 days.

(21) Appl. No.: 16/196,062

(22) Filed: Nov. 20, 2018

(65) Prior Publication Data
US 2020/0158369 A1    May 21, 2020

(51) Int. Cl.
*F24F 11/64*    (2018.01)
*G05B 13/02*    (2006.01)
(Continued)

(52) U.S. Cl.
CPC .............. *F24F 11/64* (2018.01); *F24F 11/76* (2018.01); *G05B 13/027* (2013.01);
(Continued)

(58) Field of Classification Search
CPC ........ F24F 11/64; F24F 11/76; F24F 2110/10; F24F 2110/20; F24F 2110/70;
(Continued)

(56) References Cited

U.S. PATENT DOCUMENTS 5,769,315 A * 6/1998 Drees ...................... F24F 11/62
236/49.3
7,653,459 B2   1/2010 Pouchak et al.
(Continued)

OTHER PUBLICATIONS

C. Guo, Q. Song and W. Cai, "Real-time control of variable air volume system based on a robust neural network assisted PI controller," 2004 IEEE International Joint Conference on Neural Networks (IEEE Cat. No. 04CH37541), 2004, pp. 1847-1852 vol. 3, doi: 10.1109/IJCNN.2004.1380890. (Year: 2004).*
(Continued)

*Primary Examiner* — Darrin D Dunn
(74) *Attorney, Agent, or Firm* — RatnerPrestia

(57) ABSTRACT

A method and computing device for inferring an airflow of a controlled appliance operating in an area of a building. The computing device stores a predictive model. The computing device determines a measured airflow of the controlled appliance and a plurality of consecutive temperature measurements in the area. The computing device executes a neural network inference engine using the predictive model for inferring an inferred airflow based on inputs. The inputs comprise the measured airflow and the plurality of consecutive temperature measurements. The inputs may further include at least one of a plurality of consecutive humidity level measurements in the area and a plurality of consecutive carbon dioxide ($CO_2$) level measurements in the area. For instance, the controlled appliance is a Variable Air Volume (VAV) appliance and a K factor of the VAV appliance is calculated based on the inferred airflow.

15 Claims, 11 Drawing Sheets

(51) Int. Cl.
  *G05B 13/04* (2006.01)
  *F24F 11/76* (2018.01)
  *F24F 110/10* (2018.01)
  *F24F 110/20* (2018.01)
  *F24F 110/70* (2018.01)

(52) U.S. Cl.
  CPC ........ *G05B 13/048* (2013.01); *F24F 2110/10* (2018.01); *F24F 2110/20* (2018.01); *F24F 2110/70* (2018.01)

(58) Field of Classification Search
  CPC ........ F24F 11/74; F24F 2110/40; F24F 11/62; G05B 13/027; G05B 13/048; Y02B 30/70
  See application file for complete search history.

(56) References Cited

U.S. PATENT DOCUMENTS

| | | | | |
|---|---|---|---|---|
| 10,047,968 | B2* | 8/2018 | Barooah | F24F 11/62 |
| 10,438,125 | B2* | 10/2019 | Bai | G06N 5/047 |
| 10,641,507 | B2* | 5/2020 | Ji | G05B 6/02 |
| 10,901,376 | B2* | 1/2021 | Perez | G05B 15/02 |
| 10,921,833 | B2* | 2/2021 | Ploegert | G05D 23/1904 |
| 11,053,880 | B1* | 7/2021 | Yamada | F02D 13/0215 |
| 2004/0182941 | A1* | 9/2004 | Alles | F24F 3/0442 236/49.3 |
| 2005/0006488 | A1 | 1/2005 | Stanimirovic | |
| 2013/0190930 | A1* | 7/2013 | Yi | H05K 7/20836 700/276 |
| 2016/0245681 | A1* | 8/2016 | Maginnis | G01F 1/688 |
| 2018/0052078 | A1* | 2/2018 | Newberger | G01M 15/05 |
| 2018/0113482 | A1 | 4/2018 | Vitullo | |
| 2019/0041811 | A1* | 2/2019 | Drees | G06N 3/08 |
| 2019/0294186 | A1* | 9/2019 | Ploegert | G05D 23/1917 |
| 2019/0309980 | A1* | 10/2019 | Larsson | F24F 1/0035 |
| 2020/0226650 | A1* | 7/2020 | Shah | F24F 11/63 |
| 2020/0301408 | A1* | 9/2020 | Elbsat | G05B 23/0291 |
| 2020/0312462 | A1* | 10/2020 | Dubois | G16H 50/30 |
| 2020/0326676 | A1* | 10/2020 | Perez | G05B 13/041 |
| 2020/0356087 | A1* | 11/2020 | Elbsat | G05B 23/0254 |
| 2021/0006621 | A1* | 1/2021 | Knight | G05B 19/048 |

OTHER PUBLICATIONS

HVACBRAIN, "What is the K factor and how do we use it in HVAC applications?", Mar. 27, 2017, 8 pages, https://www.hvacbrain.com/blog/k-factor-in-hvac/.

* cited by examiner

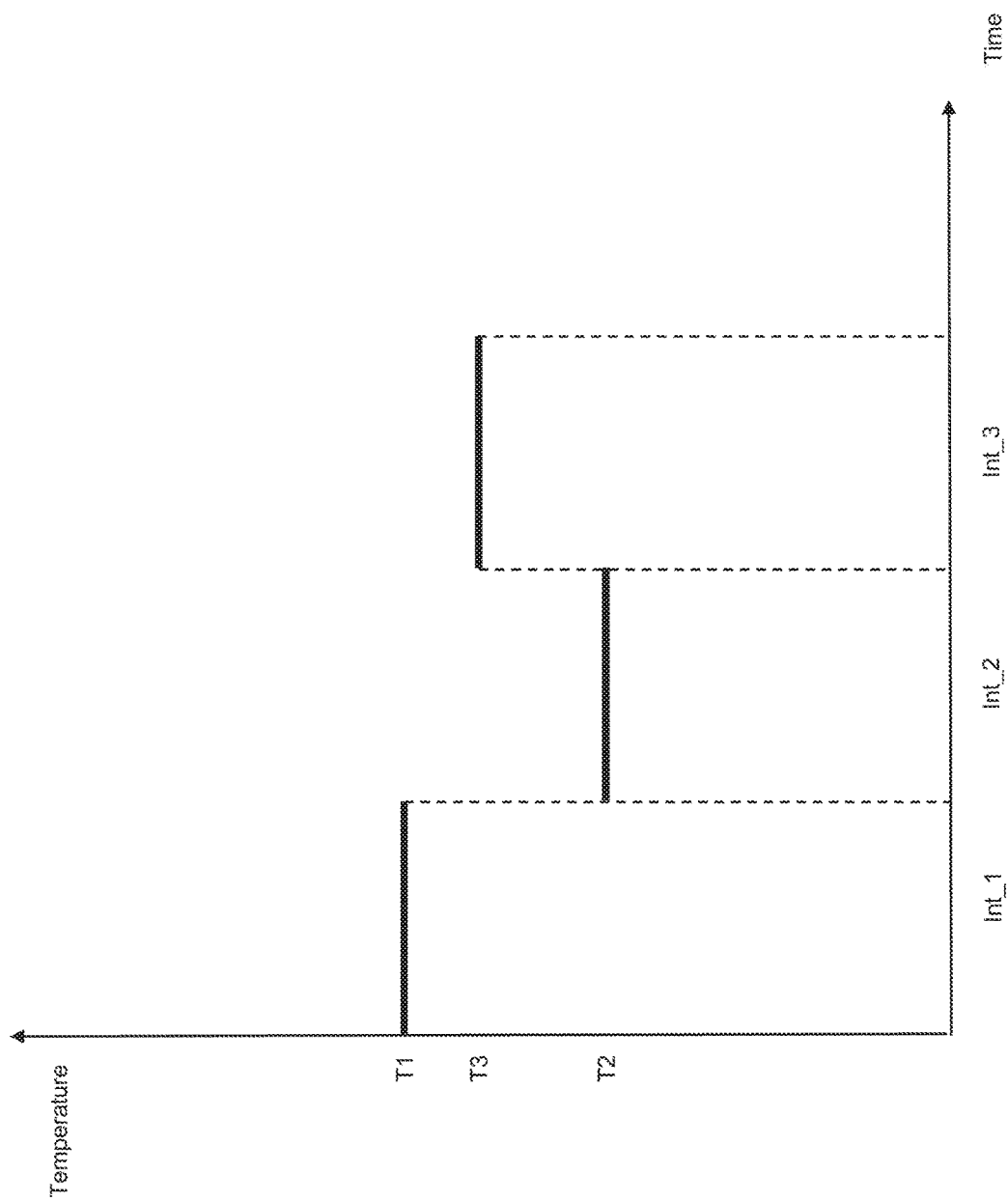

COMPUTING DEVICE AND METHOD FOR INFERRING AN AIRFLOW OF A VAV APPLIANCE OPERATING IN AN AREA OF A BUILDING

TECHNICAL FIELD

The present disclosure relates to the field of building automation, and more precisely to air flow control in an area of a building. More specifically, the present disclosure presents a computing device and a method for inferring an airflow of a VAV appliance operating in the area of the building.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from external sensors, and in turn determines set-points or command parameters to be sent to controlled appliances.

An example of controlled appliance is a Variable Air Volume (VAV) appliance. VAV appliances are deployed in various areas of a building, to regulate the temperature, humidity level and CO2 level in these various areas. The VAV appliances are generally controlled by one or more environment controller deployed in the building to implement an environment control system.

A VAV appliance generally includes an airflow sensor, capable of measuring an airflow generated by the VAV appliance during operations. The measured airflow is used directly by the VAV appliance for auto-regulating the operations of the VAV appliance, and can also be transmitted to an environment controller for providing a feedback on the operations of the VAV appliance.

The accuracy of the airflow measured by the airflow sensor is therefore of paramount importance to ensure proper operations of the VAV appliance. However, when the VAV appliance is installed, the airflow measured by the airflow sensor may not be accurate. This lack of accuracy is caused by a default in the configuration of the airflow sensor, by specific environmental conditions not compatible with the factory configuration of the airflow sensor, etc.

To correct the lack of accuracy of the airflow sensor, an intervention by a specialized technician is usually required. The technician measures the real airflow of the VAV appliance, compares it to the air flow measured by the airflow sensor, and reconfigures the airflow sensor accordingly. This procedure is well known in the art and is referred to as balancing. Practically, it consists in adjusting a K factor of the airflow sensor, as will be detailed later in the description.

The configuration procedure being made by a technician makes it costly financially and in terms of delay before the VAV appliance is fully operational after its initial deployment. The procedure is also prone to human errors. Thus, it would be beneficial to automate this configuration procedure.

Current advances in artificial intelligence, and more specifically in neural networks, can be taken advantage of for automating the determination of the real airflow of the VAV appliance.

Therefore, there is a need for a computing device and a method for inferring an airflow of a VAV appliance operating in an area of a building.

SUMMARY

According to a first aspect, the present disclosure relates to a method for inferring an airflow of a controlled appliance operating in an area of a building. The method comprises storing a predictive model in a memory of a computing device. The method comprises determining, by a processing unit of the computing device, a measured airflow of the controlled appliance. The method comprises determining, by the processing unit of the computing device, a plurality of consecutive temperature measurements in the area. The method comprises executing, by the processing unit of the computing device, a neural network inference engine using the predictive model for inferring an inferred airflow based on inputs, the inputs comprising the measured airflow and the plurality of consecutive temperature measurements.

According to a second aspect, the present disclosure relates to a non-transitory computer program product comprising instructions executable by a processing unit of a computing device. The execution of the instructions by the processing unit of the computing device provides for inferring an airflow of a controlled appliance operating in an area of a building, by implementing the aforementioned method.

According to a third aspect, the present disclosure relates to a computing device for inferring an airflow of a controlled appliance operating in an area of a building. The computing device comprises memory for storing a predictive model, and a processing unit. The processing unit determines a measured airflow of the controlled appliance. The processing unit determines a plurality of consecutive temperature measurements in the area. The processing unit executes a neural network inference engine using the predictive model for inferring an inferred airflow based on inputs, the inputs comprising the measured airflow and the plurality of consecutive temperature measurements.

In a particular aspect, the inputs further include at least one of a plurality of consecutive humidity level measurements in the area and a plurality of consecutive carbon dioxide (CO2) level measurements in the area.

In another particular aspect, the controlled appliance is a Variable Air Volume (VAV) appliance and a K factor of the VAV appliance is calculated based on the inferred airflow.

BRIEF DESCRIPTION OF THE DRAWINGS

Embodiments of the disclosure will be described by way of example only with reference to the accompanying drawings, in which:

FIG. 5A illustrates a plurality of consecutive temperature measurements;

DETAILED DESCRIPTION

Figure 1:
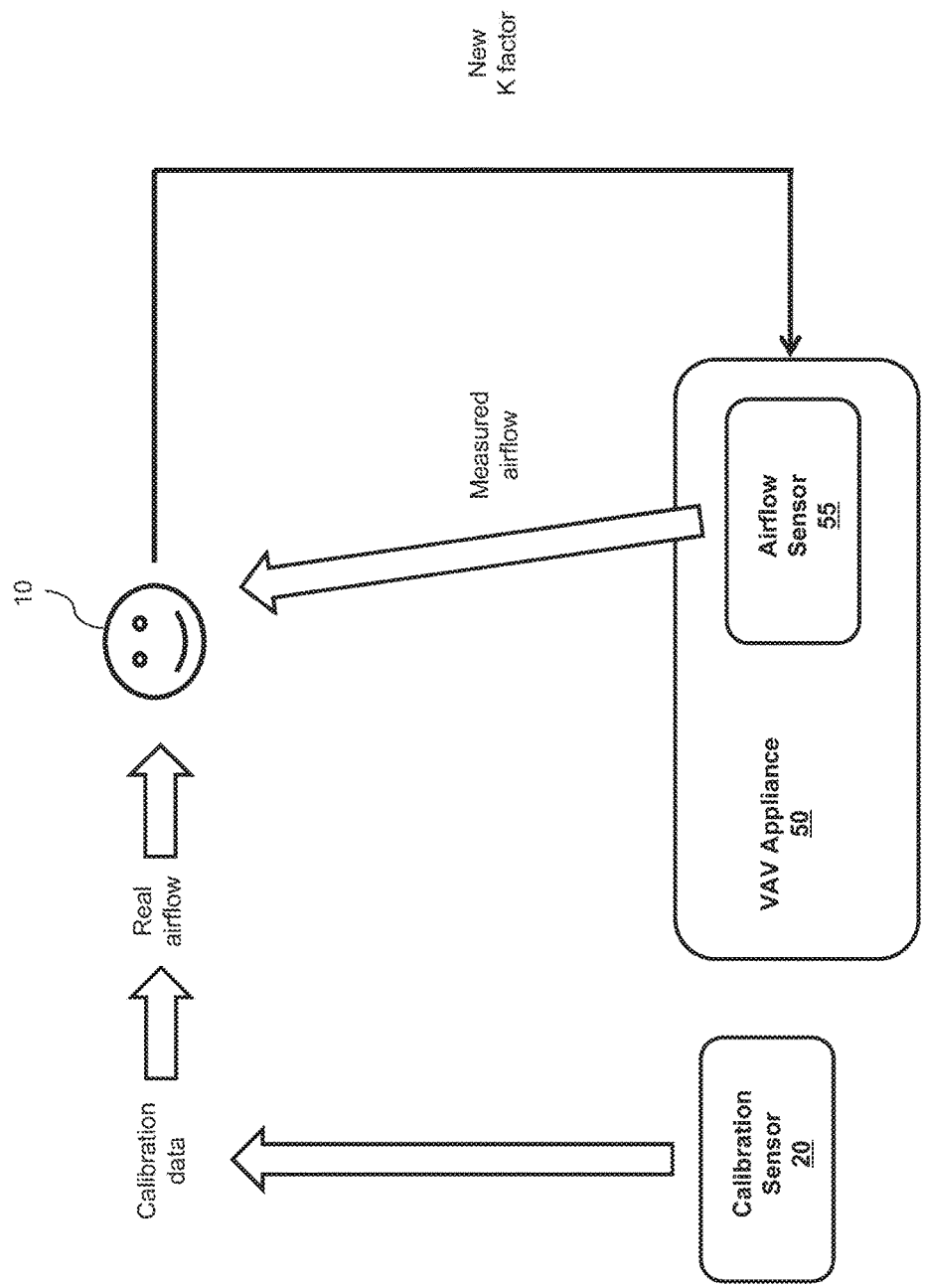
FIG. 1 illustrates a manual procedure for adjusting a K factor of a Variable Air Volume (VAV) appliance.

The foregoing and other features will become more apparent upon reading of the following non-restrictive description of illustrative embodiments thereof, given by way of example only with reference to the accompanying drawings.

Various aspects of the present disclosure generally address one or more of the problems related to environment control systems for buildings. More particularly, the present disclosure aims at providing solutions for automating the configuration of an airflow sensor of a VAV appliance operating in an area of a building. The automation is based on the usage of a neural network for inferring the 'real' airflow of the VAV appliance by contrast to the airflow of the VAV appliance measured by the airflow sensor. Based on the inference of the 'real' airflow, the airflow sensor is reconfigured to provide a more accurate measure of the airflow of the VAV appliance.

The following terminology is used throughout the present specification:

Environment: condition(s) (temperature, pressure, oxygen level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, CO2, flow, radiation, water level, speed, sound; a variation of at least one of the following, temperature, pressure, humidity and lighting, CO2 levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: the expression 'area of a building' is used throughout the present specification to refer to the interior of a whole building or a portion of the interior of the building such as, without limitation: a floor, a room, an aisle, etc.

Referring now to FIG. 1, a VAV appliance 50 comprising an airflow sensor 55 is illustrated. As mentioned previously, the airflow sensor 55 measures an airflow generated by the VAV appliance 50 during operations of the VAV appliance 50. The measured airflow is used directly by the VAV appliance 50 as a feedback loop for auto-regulating the operations of the VAV appliance 50 (for instance, maintaining a constant airflow value in a room while the environmental conditions of the room are changing). The measured airflow may also be transmitted to an environment controller (not represented in FIG. 1 for simplification purposes) controlling the VAV appliance 50, for providing a feedback loop on the operations of the VAV appliance 50.

In a first implementation, the airflow sensor 55 is capable of directly measuring the airflow of the VAV appliance 50. However, this type of sensor may be costly and other implementations are usually preferred.

In a second implementation, the airflow sensor 55 measures a velocity pressure of the airflow in the VAV appliance 50. The velocity pressure of the airflow is a differential pressure DP, consisting of the difference between a total pressure and a static pressure measured by a differential pressure sensor integrated to the airflow sensor 55. The differential pressure DP is then used by the airflow sensor 55 for calculating the value of the airflow Q. For instance, the airflow sensor 55 includes the differential pressure sensor and a processing unit (not represented in FIG. 1 for simplification purposes). The processing unit is capable of calculating the value of the airflow Q based on the differential pressure DP measured by the differential pressure sensor.

Alternatively, the VAV appliance 50 does not have an integrated airflow sensor 55, but includes a differential pressure sensor and a processing unit used for calculating the value of the airflow Q based on the differential pressure DP measured by the differential pressure sensor.

In a first step, a velocity pressure V is calculated as follows:

$$V = 4005 * \sqrt{\frac{DP}{K\text{ factor}}} \quad \text{Equation (1)}$$

where V is expressed in feet per minute (fpm), 4005 is a constant specific to this equation, DP is expressed in inches water column (wc), and K factor is a constant provided by the manufacturer of the VAV appliance 50.

In a second step, the airflow Q is calculated as follows:

$$Q = V^* \text{area} = 4005 * \sqrt{\frac{DP}{K \text{ factor}}} * \text{area} \quad \text{Equation (2)}$$

where Q is expressed in cubic feet per minute (CFM), and area is a cross sectional surface of a duct (expressed in square feet) through which the airflow circulates in the VAV appliance 50.

The K factor is representative of characteristics of the VAV appliance 50, including geometric characteristics of the VAV appliance (e.g. the duct area), dynamic characteristics of components of the VAV appliance (e.g. dynamics of a pitot tube), etc. A manufacturer of VAV appliances provides a reference table for matching a list of K factors with corresponding characteristics of VAV appliances.

For the airflow sensor 55 to provide an accurate measure, the VAV appliance 50 needs to be configured with the value of the K factor corresponding to its characteristics (according to the reference table provided by the manufacturer).

However, it may happen that when a new VAV appliance 50 is installed, the airflow measured by the airflow sensor 55 is not accurate. As mentioned previously, this lack of accuracy may be caused by a default in the factory configuration of the airflow sensor (e.g. a wrong value for the K factor has been configured), by specific environmental conditions not compatible with the factory configuration of the airflow sensor (in this case, a proper value for the K factor has been configured but still needs to be changed), etc.

To detect the lack of accuracy of the airflow measured by the airflow sensor 55, an intervention by a specialized technician 10 is required. The technician 10 determines the real airflow of the VAV appliance 50 and compares it to the air flow measured by the airflow sensor 55. For this purpose, the technician 10 uses a calibration sensor 20 providing calibration data from which the real airflow of the VAV appliance 50 is determined.

If the real airflow and the measured airflow are equal, or at least within a pre-defined acceptable error threshold, the airflow sensor 55 is considered to be properly configured. Otherwise, the technician 10 calculates a K factor based on the currently configured K factor, the real airflow and the measured airflow. The technician 10 then reconfigures the airflow sensor 55 with the calculated K factor. Practically, the technician 10 selects a K factor value among a list of pre-defined K factor values for the VAV appliance 50, which is closest to the calculated K factor. The technician 10 reconfigures the airflow sensor 55 with the selected closest K factor value.

The determination of the calculated K factor $K_1$ based on the currently configured K factor $K_0$, the real airflow $Q_r$ and the measured airflow $Q_m$ is based on the following equations:

$$Q_r = 4005 * \sqrt{\frac{DP}{K1}} * \text{area} \quad \text{Equation (3)}$$

$$Q_m = 4005 * \sqrt{\frac{DP}{K0}} * \text{area} \quad \text{Equation (4)}$$

$$K_1 = K_0 * \left(\frac{Qm}{Qr}\right)^2 \quad \text{Equation (5)}$$

It should be noted that the technician 10 has either direct access to the airflow sensor 55 for performing the reconfiguration of the K factor; or has access to a reconfiguration component of the VAV appliance 50 in charge of reconfiguring the K factor used by the airflow sensor 55.

Referring now concurrently to FIGS. 2, 3, 4A, 4B, 5A, 5B, 5C and 6, a computing device 100 (FIG. 2) and a method 400 for inferring an airflow of a controlled appliance operating in an area of a building (FIGS. 4A-B) are illustrated.

Figure 2:
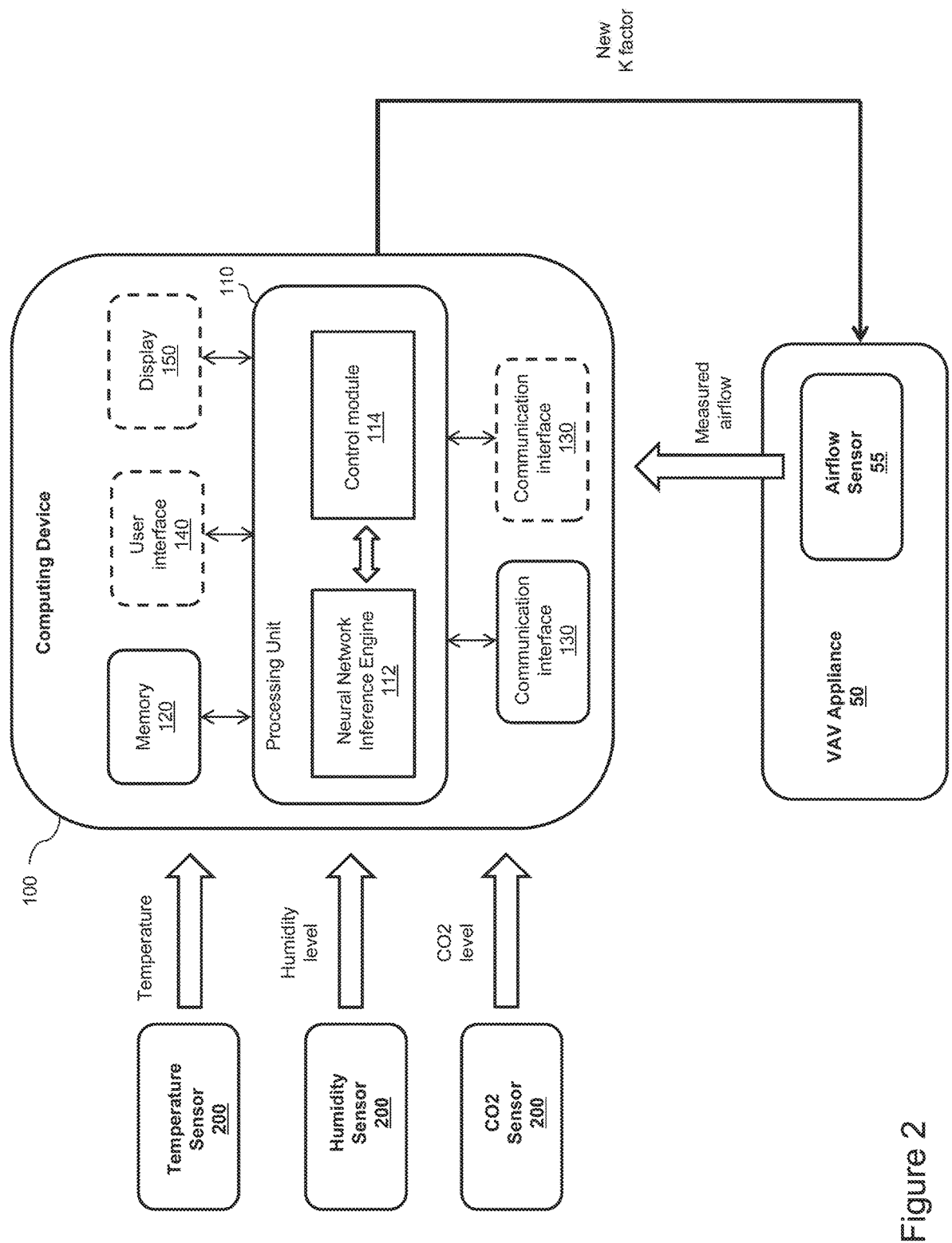
FIG. 2 represents a computing device capable of inferring an airflow of a controlled appliance operating in an area of a building.

FIG. 2 also represents the VAV appliance 50 and airflow sensor 55 of FIG. 1. The computing device 100 is used for automating (through the use of a neural network) at least some of the operations performed by the technician of FIG. 1.

The area of the building where the VAV appliance 50 is operating is not represented in the Figures for simplification purposes. As mentioned previously, the area may consist of a room, a floor, an aisle, etc.

The computing device 100 receives environment characteristic values measured by sensors 200. The environment characteristic values are directly transmitted by the sensors 200 to the computing device 100. Alternatively, one or more intermediate device (not represented in the Figures for simplification purposes) collects the environment characteristic values from the sensors 200 and forwards the environment characteristic values to the computing device 100.

Examples of sensors 200 include a temperature sensor, capable of measuring a temperature in the area and transmitting the temperature measured in the area to the computing device 100. The examples also include a humidity sensor, capable of measuring a humidity level in the area and transmitting the humidity level measured in the area to the computing device 100. The examples further include a carbon dioxide ($CO_2$) sensor, capable of measuring a $CO_2$ level in the area and transmitting the $CO_2$ level measured in the area to the computing device 100.

The aforementioned examples of sensors 200 are for illustration purposes only, other types of sensors 200 (e.g. an occupancy sensor, etc.) could be used in the context of the present disclosure. Furthermore, each environmental characteristic value measured by a sensor 200 may consist of either a single value (e.g. current temperature of 25 degrees Celsius), or a range of values (e.g. current temperature in the range of 25 to 26 degrees Celsius).

A single sensor 200 measures a given type of environment characteristic value (e.g. temperature) for the whole area. Alternatively, the area is divided into a plurality of zones, and a plurality of sensors 200 measures the given type of environment characteristic value (e.g. temperature) in the corresponding plurality of zones. The computing device 100 calculates an environment characteristic value for the area (e.g. an average temperature for the area) based on the environment characteristic values transmitted by the plurality of sensors 200 respectively located in the plurality of zones of the area.

Details of the computing device 100 and sensors 200 will now be provided.

The computing device 100 comprises a processing unit 110, memory 120, and a communication interface 130. The computing device 100 may comprise additional components, such as another communication interface 130, a user interface 140, a display 150, etc.

The processing unit 110 comprises one or more processors (not represented in FIG. 2) capable of executing instructions of a computer program. Each processor may further comprise one or several cores.

The memory 120 stores instructions of computer program(s) executed by the processing unit 110, data generated by the execution of the computer program(s), data received via the communication interface 130 (or another communication interface), etc. Only a single memory 120 is represented in FIG. 2, but the computing device 100 may comprise several types of memories, including volatile memory (such as a volatile Random Access Memory (RAM), etc.) and non-volatile memory (such as a hard drive, electrically-erasable programmable read-only memory (EEPROM), etc.).

The communication interface 130 allows the computing device 100 to exchange data with remote devices (e.g. sensors 200, VAV appliance 50, etc.) over a communication network (not represented in FIG. 2 for simplification purposes). For example, the communication network is a wired communication network, such as an Ethernet network; and the communication interface 130 is adapted to support communication protocols used to exchange data over the Ethernet network. Other types of wired communication networks may also be supported by the communication interface 130. In another example, the communication network is a wireless communication network, such as a Wi-Fi network; and the communication interface 130 is adapted to support communication protocols used to exchange data over the Wi-Fi network. Other types of wireless communication network may also be supported by the communication interface 130, such as a wireless mesh network. The communication interface 130 usually comprises a combination of hardware and software executed by the hardware, for implementing the communication functionalities of the communication interface 130. As mentioned previously, the computing device 100 may have more than one communication interface 130. For example, the computing device 100 exchanges data with the sensors 200 via a first communication interface 130 supporting a first wireless protocol (e.g. Bluetooth® Low Energy (BLE)); and the computing device 100 exchanges data with the VAV appliance 50 via a second communication interface 130 supporting a second wireless protocol (e.g. Wi-Fi).

Examples of computing device 100 include a laptop, a desktop, a server, etc. Considering the increasing processing power of mobile devices such as tablets and smartphones, these mobile devices may also be used for the computing device 100. Additionally, the computing device 100 may be implemented by an environment controller, responsible for collecting environmental data from sensors and transmitting commands to controlled appliances.

A detailed representation of the components of the sensors 200 is not provided in FIG. 2 for simplification purposes. The sensors 200 comprise at least one sensing module for detecting an environmental characteristic; and further comprise a communication interface for transmitting to the computing device 100 an environmental characteristic value (e.g. temperature, humidity level, CO2 level, etc.) corresponding to the detected environmental characteristic. The environmental characteristic value is transmitted over a communication network and received via the communication interface 130 of the computing device 100. The sensors 200 may also comprise a processing unit for generating the environmental characteristic value based on the detected environmental characteristic.

A detailed representation of all the components of the VAV appliance 50 is not provided in FIG. 2 for simplification purposes. In addition to the airflow sensor 55, the VAV appliance 50 comprises at least one actuation module (e.g. an actuation module controlling the speed of a fan, an actuation module controlling the pressure generated by a compressor, an actuation module controlling a valve defining the rate of an airflow, etc.). The VAV appliance 50 further comprises a communication interface for receiving one or more commands from an environment controller. The one or more commands control operations of the at least one actuation module. The VAV appliance 50 may also comprise a processing unit for controlling the operations of the at least one actuation module, based on the received one or more commands and measurements performed by the airflow sensor 55.

Figure 4A:
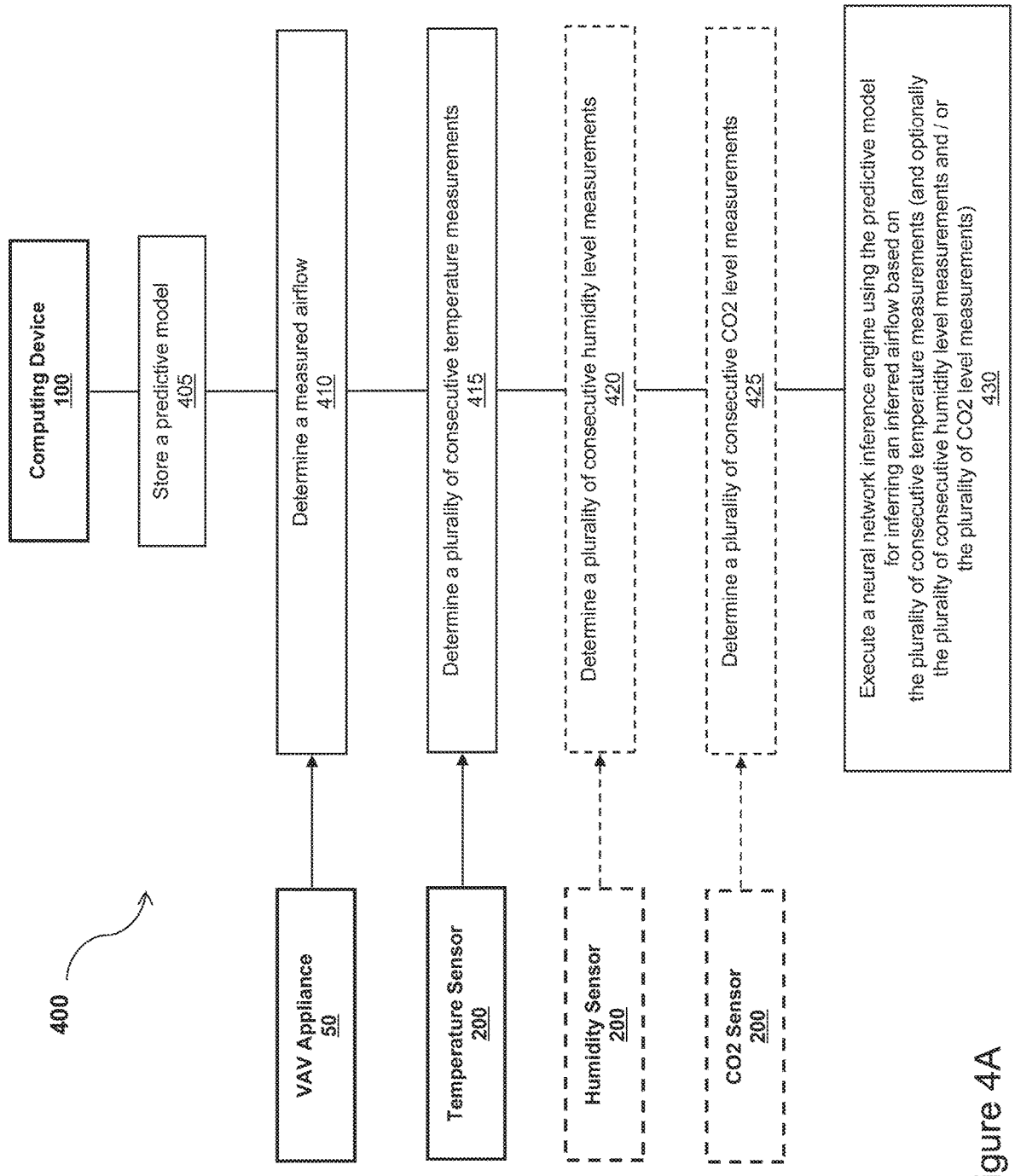
FIGS. 4A and 4B represent a method implemented by the computing device of FIG. 2 for inferring an airflow of a controlled appliance operating in an area of a building.
Figure 4B:
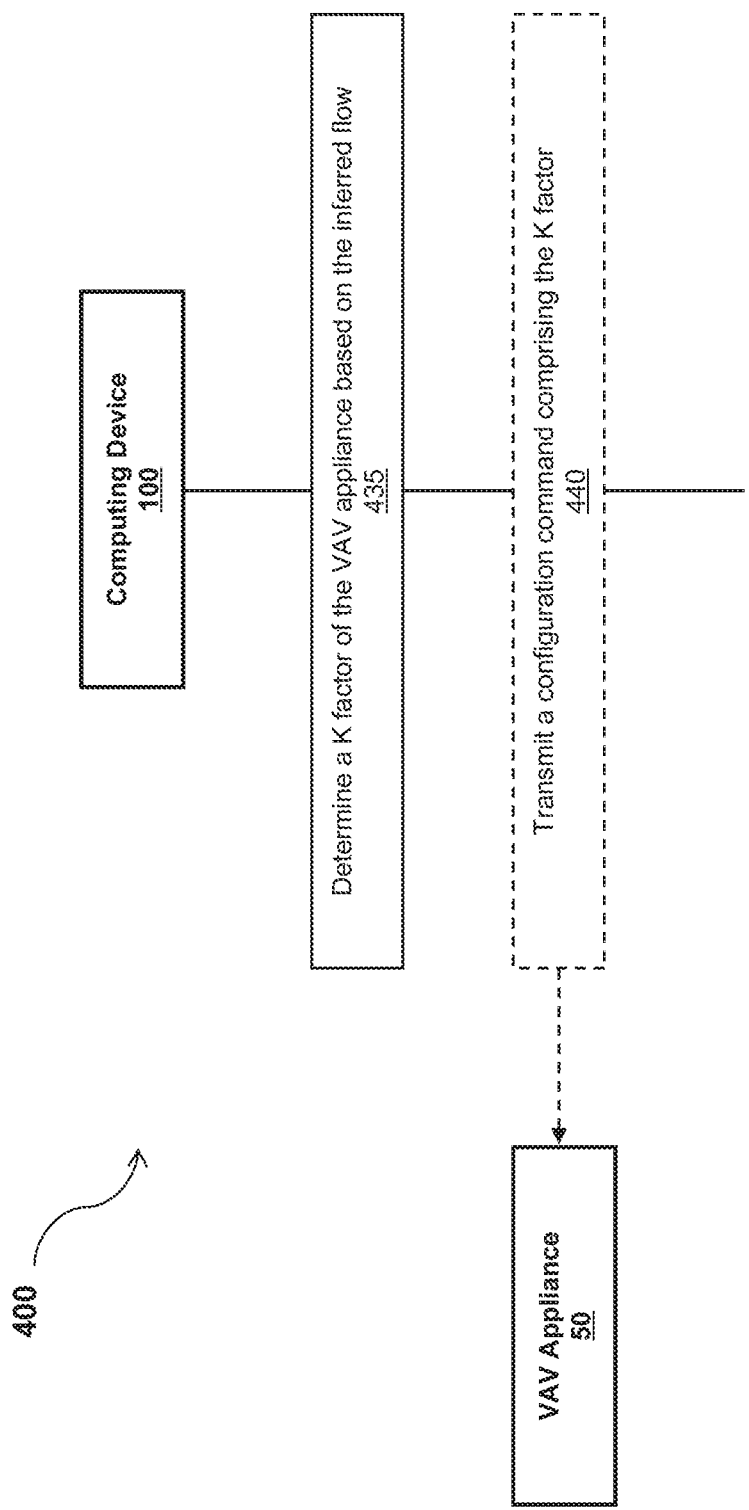

Reference is now made more specifically to FIGS. 4A and 4B. At least some of the steps of the method 400 represented in FIGS. 4A and 4B are implemented by the computing device 100, to infer an airflow of the VAV appliance 50.

A dedicated computer program has instructions for implementing at least some of the steps of the method 400. The instructions are comprised in a non-transitory computer program product (e.g. the memory 120) of the computing device 100. The instructions provide for inferring an airflow of the VAV appliance 50, when executed by the processing unit 110 of the computing device 100. The instructions are deliverable to the computing device 100 via an electronically-readable media such as a storage media (e.g. CD-ROM, USB key, etc.), or via communication links (e.g. via a communication network through the communication interface 130).

The dedicated computer program product executed by the processing unit 110 comprises a neural network inference engine 112 and a control module 114.

The method 400 comprises the step 405 of storing a predictive model in the memory 120 of the computing device 100. Step 405 is performed by the processing unit 110 of the computing device 100.

Figure 3:
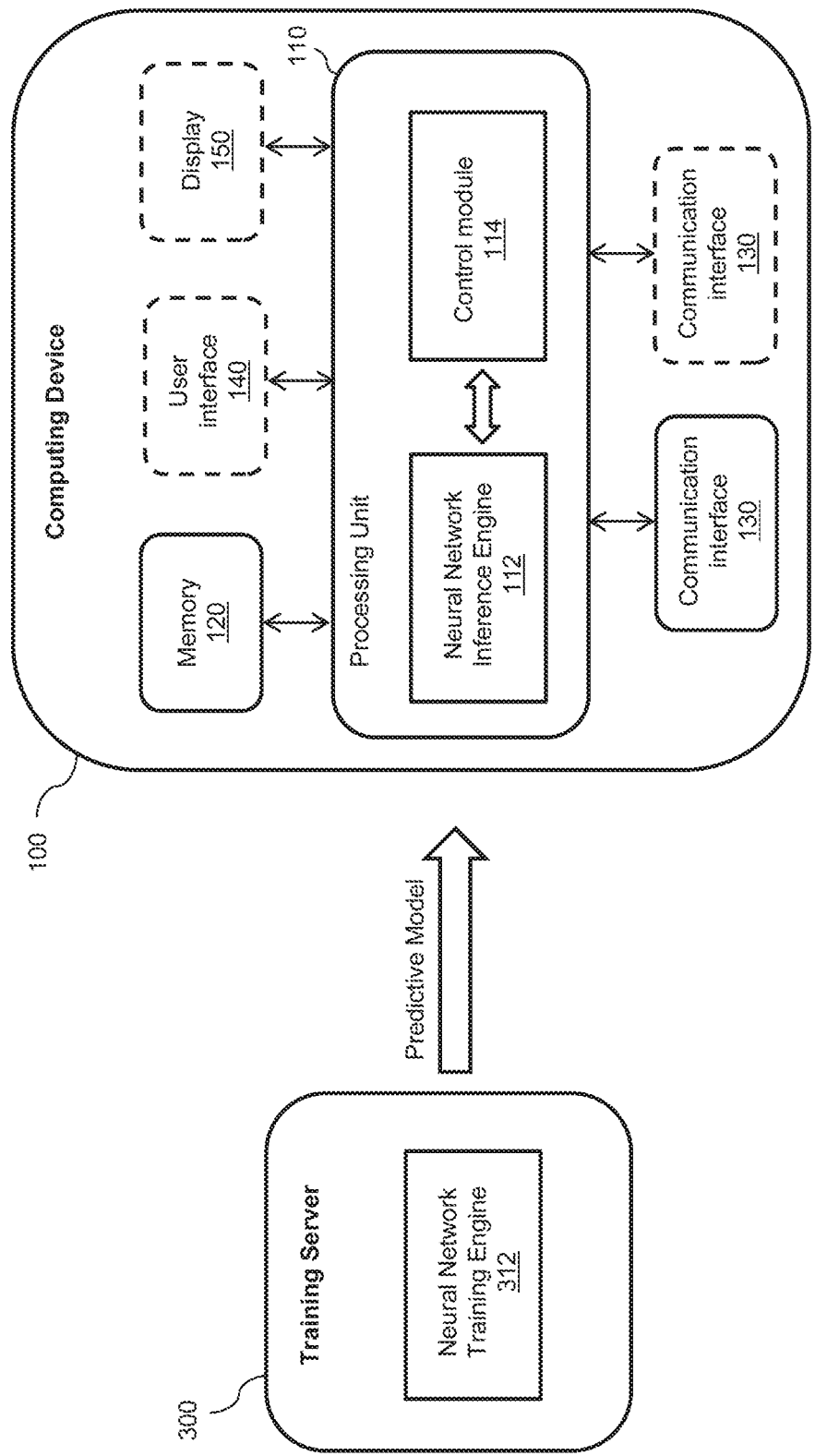
FIG. 3 represents the computing device of FIG. 2 interacting with a training server.

The predictive model is generated during a training phase which will be detailed later in the description. During the operational phase implemented by the method 400, the predictive model is used by the neural network inference engine 112. FIG. 3 illustrates the generation of the predictive model by a neural network training engine 312 executed by a processing unit of a training server 300. The predictive model generated by the neural network training engine 312 is transmitted by the training server 300 to the computing device 100 for storage in the memory 120 of the computing device 100. Alternatively, the training phase is performed directly on the computing device 100. In this case, the neural network training engine 312 is executed by the processing unit 110 of the computing device 100 to generate the predictive model and store it in the memory 120.

The method 400 comprises the step 410 of determining a measured airflow of the VAV appliance 50. Step 410 is performed by the control module 114 executed by the processing unit 110 of the computing device 100.

As mentioned previously in relation to FIG. 1, the sensor 55 is an airflow sensor capable of measuring directly the airflow of the VAV appliance 50. Alternatively, the sensor 55 includes a pressure sensor for measuring a pressure in the VAV appliance 50. The measured airflow of the VAV appliance 50 is calculated (directly by a processing unit of the sensor 55 or by a processing unit of the VAV appliance 50) based on the measured pressure, for instance by using the aforementioned equations (1) and (2). In both cases, the measured air flow is transmitted (either directly by the sensor 55 or by another component of the VAV appliance 50) to the computing device 100. Thus, the determination of the measured airflow of the VAV appliance 50 at step 410 consists in receiving the measured air flow via the communication interface 130 of the computing device 100.

Alternatively, the sensor 55 consists of the pressure sensor for measuring a pressure in the VAV appliance 50. The measured pressure is transmitted (either directly by the sensor 55 or by another component of the VAV appliance 50) to the computing device 100. Thus, the determination of the measured airflow of the VAV appliance 50 at step 410 consists in receiving the measured pressure via the communication interface 130 of the computing device 100; and calculating by the processing unit 110 the measured air flow based on the received measured pressure, for instance by using the aforementioned equations (1) and (2). The parameters (e.g. K factor and area in equations (1) and (2)) for calculating the measured air flow based on the measured pressure have been previously stored in the memory 120, are transmitted along with the measured pressure, are provided by a user via the user interface 140 of the computing device 100, etc.

The method 400 comprises the step 415 of determining a plurality of consecutive temperature measurements in the area. Step 415 is performed by the control module 114 executed by the processing unit 110 of the computing device 100. The consecutive temperature measurements are determined based on temperature data collected by the temperature sensor 200 of FIG. 2 and transmitted to the computing device 100. The temperature data are received via the communication interface 130 of the computing device 100. The consecutive temperature measurements consist of N temperature measurements respectively performed on N consecutive intervals of time, N being an integer greater or equal than 2 (e.g. 3 intervals of 30 seconds each).

Step 415 can be implemented in different ways. For example, for each interval of time, the temperature sensor 200 is configured to spontaneously make a single temperature measurement, which is transmitted to the computing device 100 and used for a given interval of time at step 415. Alternatively, for each interval of time, the temperature sensor 200 is configured to spontaneously make several temperature measurements, the average of the several temperature measurements being calculated and transmitted by the temperature sensor 200 to the computing device 100, to be used for a given interval of time at step 415. In still another alternative implementation, the temperature sensor 200 has no knowledge of the intervals of time and simply transmits temperature data to the computing device 100. In this case, at each interval of time, the computing device 100 sends a request to the temperature sensor 200 to transmit a temperature measurement. The temperature sensor 200 sends the requested temperature measurement to the computing device 100, which uses the temperature measurement received from the temperature sensor 200 for a given interval of time at step 415. Instead of a single temperature measurement for each interval of time, the computing device 100 may request and receive a plurality of temperature measurements from the temperature sensor 200; and use the average of the plurality of temperature measurements for a given interval of time at step 415.

FIG. 5A illustrates an exemplary implementation of step 415 with 3 intervals of times. Three consecutive temperature measurements are determined at step 415: T1 for time interval Int_1, T2 for time interval Int_2 and T3 for time interval Int_3.

The method 400 comprises the optional step 420 of determining a plurality of consecutive humidity level measurements in the area. Step 420 is performed by the control module 114 executed by the processing unit 110 of the computing device 100. The consecutive humidity level measurements are determined based on humidity level data collected by the humidity sensor 200 of FIG. 2 and transmitted to the computing device 100. The humidity level data are received via the communication interface 130 of the computing device 100. The consecutive humidity level measurements consist of N humidity level measurements respectively performed on N consecutive intervals of time, N being an integer greater or equal than 2 (e.g. 3 intervals of 30 seconds each). The number of consecutive intervals of time and the duration of each interval of time are similar for steps 415 and 420. However, steps 415 and 420 may also be implemented with a different number of intervals of time and/or a different duration for each interval of time.

Step 420 can be implemented in different ways. The exemplary implementations provided with respect to step 415 are applicable to step 420; by replacing the temperature measurements with humidity level measurements and the temperature sensor 200 with the humidity sensor 200.

Figure 5B:
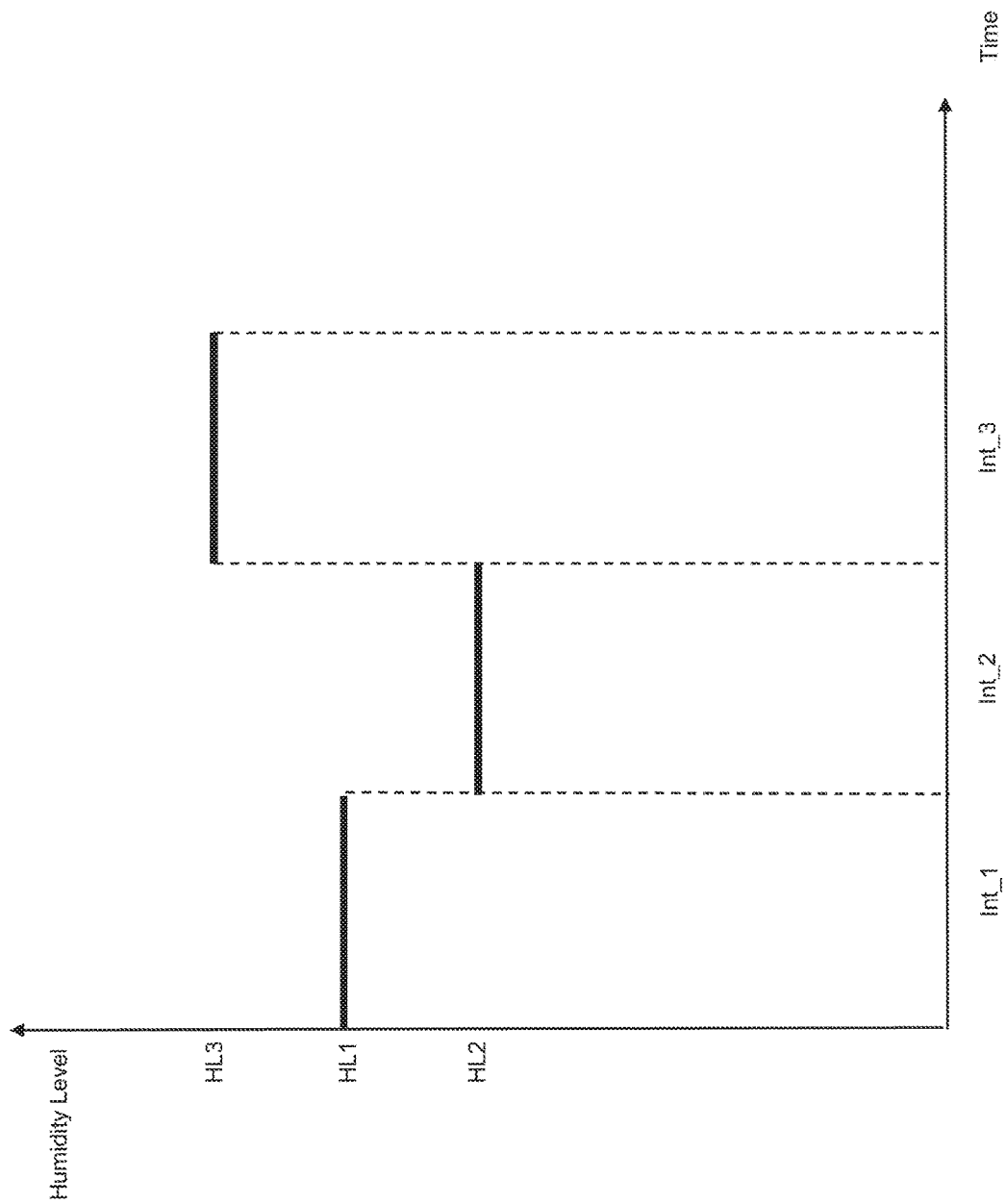
FIG. 5B illustrates a plurality of consecutive humidity level measurements.

FIG. 5B illustrates an exemplary implementation of step 420 with 3 intervals of times. Three consecutive humidity level measurements are determined at step 420: HL1 for time interval Int_1, HL2 for time interval Int_2 and HL3 for time interval Int_3.

The method 400 comprises the optional step 425 of determining a plurality of consecutive $CO_2$ level measurements in the area. Step 425 is performed by the control module 114 executed by the processing unit 110 of the computing device 100. The consecutive $CO_2$ level measurements are determined based on $CO_2$ data collected by the $CO_2$ sensor 200 of FIG. 2 and transmitted to the computing device 100. The $CO_2$ level data are received via the communication interface 130 of the computing device 100. The consecutive $CO_2$ level measurements consist of N $CO_2$ level measurements respectively performed on N consecutive intervals of time, N being an integer greater or equal than 2 (e.g. 3 intervals of 30 seconds each). The number of consecutive intervals of time and the duration of each interval of time are similar for steps 415 and 425 (and optionally 420). However, steps 415 and 425 (and optionally 420) may also be implemented with a different number of intervals of time and/or a different duration for each interval of time.

Step 425 can be implemented in different ways. The exemplary implementations provided with respect to step 415 are applicable to step 425; by replacing the temperature measurements with $CO_2$ level measurements and the temperature sensor 200 with the $CO_2$ sensor 200.

Figure 5C:
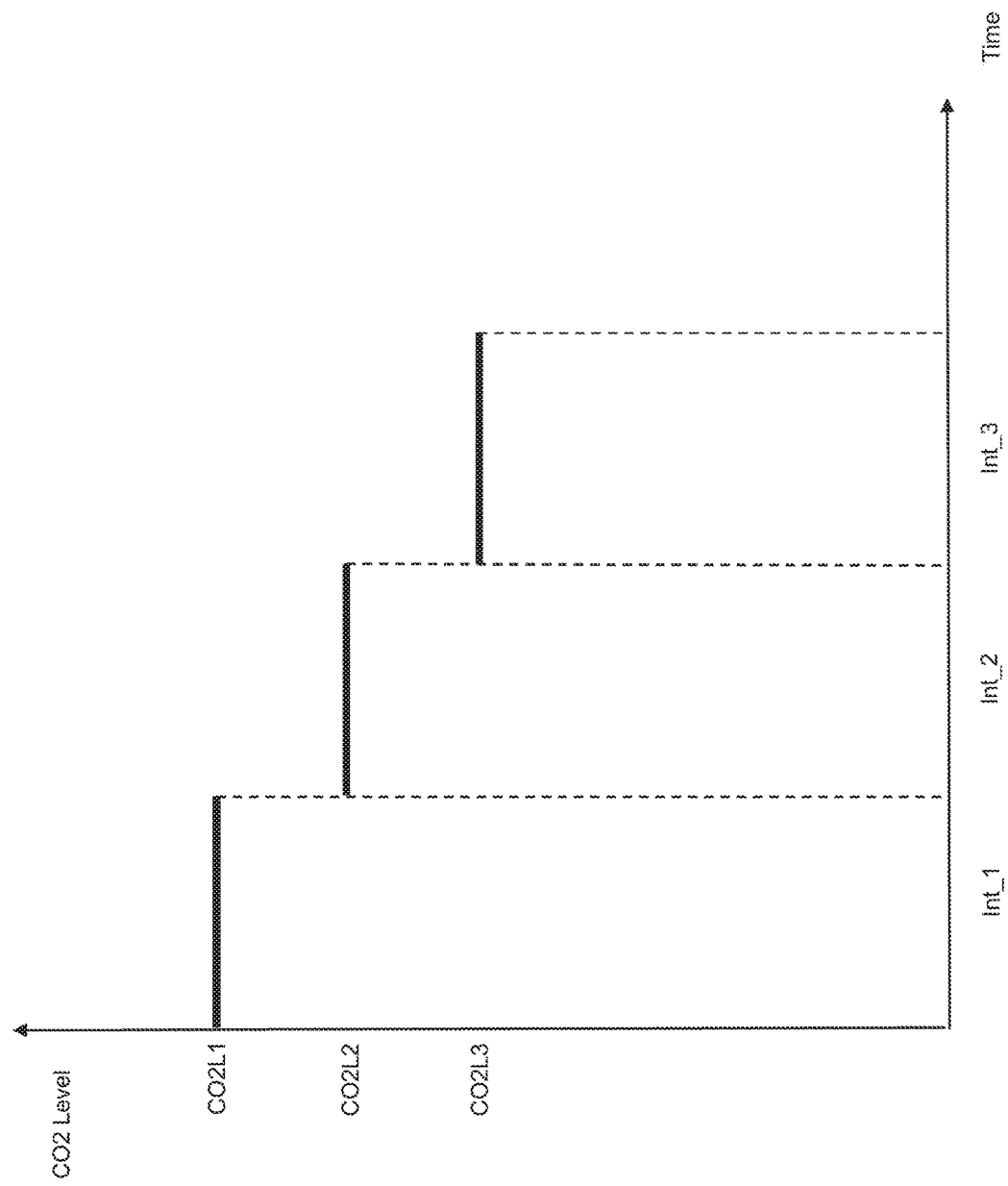
FIG. 5C illustrates a plurality of consecutive CO2 level measurements.

FIG. 5C illustrates an exemplary implementation of step 425 with 3 intervals of times. Three consecutive $CO_2$ level measurements are determined at step 425: CO2L1 for time interval Int_1, CO2L2 for time interval Int_2 and CO2L3 for time interval Int_3.

The method 400 comprises the step 430 of executing the neural network inference engine 112 using the predictive model (stored at step 405) for inferring an output based on inputs. Step 430 is performed by the processing unit 110 of the computing device 100.

The inputs include the measured airflow (determined at step 410), the plurality of consecutive temperature measurements (determined at step 415), optionally the plurality of consecutive humidity level measurements (determined at step 420), and optionally the plurality of consecutive $CO_2$ level measurements (determined at step 425). The output consists in an interred airflow of the VAV appliance 50.

As mentioned in relation to FIG. 1, the measured airflow is erroneous due to a defective configuration of the VAV appliance 50/sensor 55. The inferred airflow is a more accurate value than the measured airflow calculated by the VAV appliance 50 based on the measures provided by the sensor 55. The neural network allows to "guess" the more accurate inferred value of the airflow knowing the erroneous measured value of the airflow and the other input parameters.

It has been determined experimentally that step 430 is more effective when a plurality of consecutive temperature measurements (and optionally a plurality of consecutive humidity level measurements and/or a plurality of consecutive CO2 level measurements) are used as inputs, instead of a single temperature measurement (and optionally a single humidity level measurement and/or a single CO2 level measurement).

In addition to the measured airflow, the inputs include one of the following combinations: the plurality of consecutive temperature measurements only; the plurality of consecutive temperature measurements and the plurality of consecutive humidity level measurements; the plurality of consecutive temperature measurements and the plurality of consecutive CO2 level measurements; the plurality of consecutive temperature measurements, the plurality of consecutive humidity level measurements and the plurality of consecutive CO2 level measurements. The selection of one of the combinations is determined experimentally during the training phase. For example, it may be determined that at least one of the humidity level and the CO2 level has a marginal impact, and can therefore be omitted from the inputs of the neural network. Having more inputs for the neural network may improve the accuracy of the inference, at the cost of having a more complex predictive model and a more complex execution of the training phase (more data need to be collected and processed for generating the predictive model).

Figure 6:
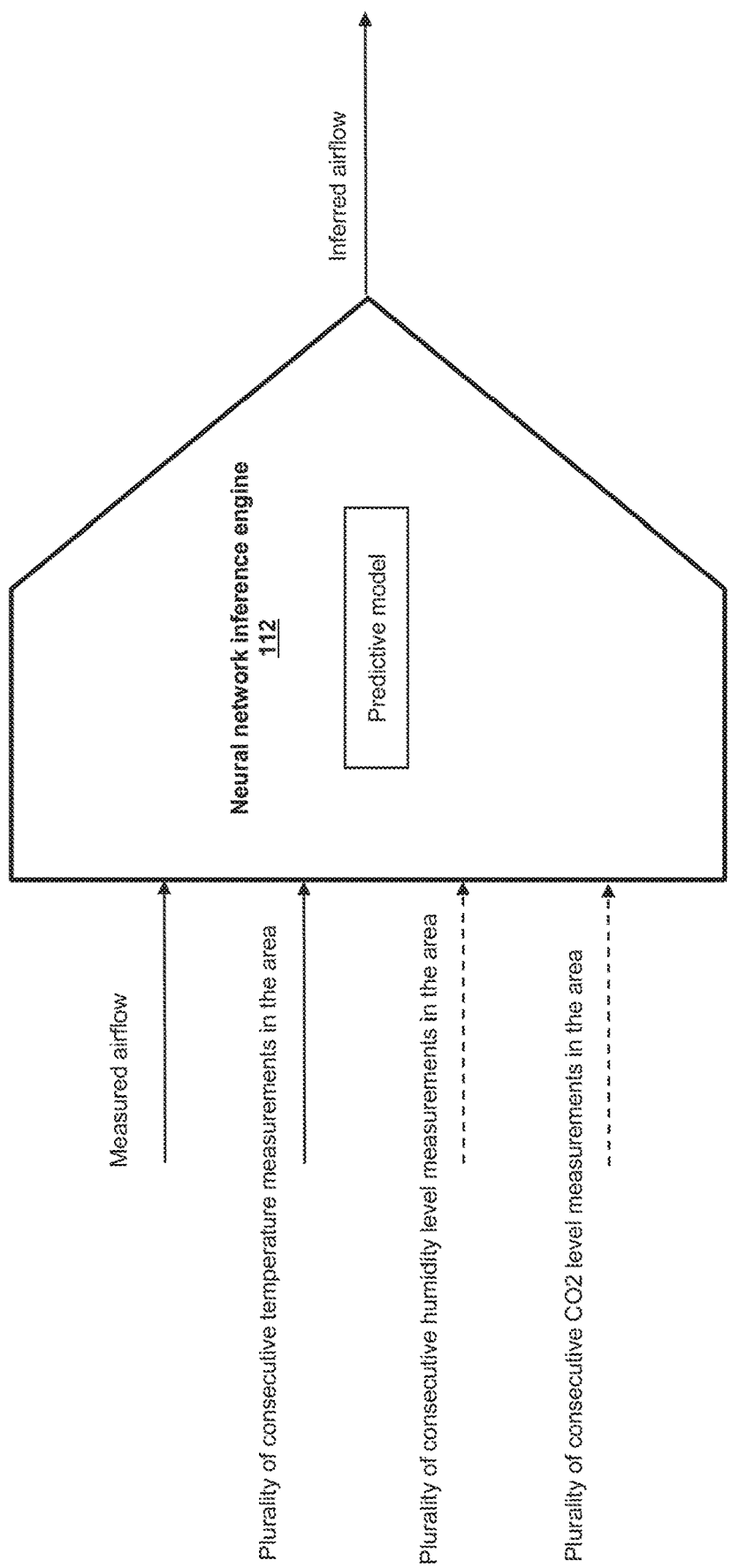
FIG. 6 is a schematic representation of a neural network inference engine executed by the computing device of FIG. 2 according to the method of FIGS. 4A-B.

FIG. 6 illustrates the inputs and the outputs used by the neural network inference engine 112 when performing step 430.

Additional input parameters may be used by the neural network inference engine 112. For example, an external temperature measurement may also be used for the inputs at step 430. The external temperature is measured outside the building where the area is located. A single external temperature measurement is used over the consecutive intervals of time considered at step 415, since the external temperature does not vary much over the consecutive intervals of time used for step 415. An external temperature sensor (not represented in FIG. 2 for simplification purposes) measures the external temperature outside of the building and transmits the measured external temperature to the computing device 100, for use at step 430.

Similarly, an external humidity level measurement may also be used for the inputs at step 430. The external humidity level is measured outside the building where the area is located. A single external humidity level measurement is used over the consecutive intervals of time considered at step 420, since the external humidity level does not vary much over the consecutive intervals of time used for step 420. An external humidity sensor (not represented in FIG. 2 for simplification purposes) measures the external humidity level outside of the building and transmits the measured external humidity level to the computing device 100, for use at step 430.

The method 400 comprises the step 435 of determining the K factor of the VAV appliance 50 based on the inferred airflow determined at step 430. Step 435 is at least partially performed by the control module 114 executed by the processing unit 110 of the computing device 100. For instance, the aforementioned equation (5) is used for calculating the K factor. The inferred airflow determined at step 430 is used as the real airflow $Q_R$ in equation (5).

In a first implementation, the control module 114 is capable of calculating the K factor. For example, if equation (5) is used, the calculation uses the measured air flow (determined at step 410), the inferred airflow (determined at step 430) and a value of the K factor currently configured at the VAV appliance 50. The value of the K factor currently configured at the VAV appliance 50 has been previously stored in the memory 120, transmitted along with the measured pressure or the measured airflow at step 410, provided by a user via the user interface 140 of the computing device 100, etc.

Following the calculation of the K factor, the control module 114 performs the optional step 440 of the method 400, consisting in transmitting a configuration command comprising the K factor calculated at step 435 to the VAV appliance 50. The VAV appliance 50 is capable of automatically reconfiguring its K factor based on the command received from the computing device. Alternatively, the K factor calculated ate step 435 is displayed on the display 150 of the computing device 100. A user of the computing device 100 manually reconfigures the VAV appliance 50 based on the calculated K factor displayed on the display 150.

In a second implementation, the control module 114 is not capable of calculating the K factor. In this case, the inferred air flow determined at step 430 and optionally the measured airflow determined at step 410 are displayed on the display 150 of the computing device 100.

A user of the computing device 100 performs the calculation of the K factor (by means out of the scope of the present disclosure) based on the information displayed on the display 150, and manually reconfigures the VAV appliance 50 based on the calculated K factor.

As mentioned previously in relation to FIG. 1, the VAV appliance 50 is generally configurable with a K factor value selected among a list of pre-defined K factor values. Thus, based on one of the previously mentioned implementations, one of the control module 114, the user of the computing device 100 and the VAV appliance 50 itself selects a K factor value among the list of pre-defined K factor values which is closest to the calculated K factor. The selected K factor value is used for the configuration of the VAV appliance 50.

The mechanism disclosed in the present disclosure takes advantage of the neural network technology, to "guess" the value of the airflow at step 430, based on a predictive model generated during a training phase.

As is well known in the art of neural network, during the training phase, the neural network implemented by the neural network training engine 312 of FIG. 3 adjusts its weights. Furthermore, during the training phase, the number of layers of the neural network and the number of nodes per layer can be adjusted to improve the accuracy of the model. At the end of the training phase, the predictive model generated by the neural network training engine 312 includes the number of layers, the number of nodes per layer, and the weights.

The neural network training engine 312 is trained with a plurality of data sets, each data set comprising training inputs and a corresponding training output. Each set of training inputs comprises an airflow measured by the sensor 55/VAV appliance 50, a plurality of consecutive temperature measurements, optionally a plurality of consecutive humidity level measurements, and optionally a plurality of consecutive CO2 level measurements. Additional optional training inputs such as an external temperature and/or an external humidity level (measured outside the building) may also be used. Each corresponding output consists of a real airflow of the VAV appliance 50 determined by a technician as illustrated in FIG. 1. Using the plurality of data sets comprising the inputs and the corresponding outputs, the neural network implemented by the neural network training engine 312 automatically adjusts its weights. It is mandatory that the same inputs and outputs are used by the neural network training engine 312 during the training phase and the neural network inference engine 112 during the operational phase.

The inputs and outputs for the training phase of the neural network are collected through an experimental process. The procedure illustrated in FIG. 1 can be adapted for the training phase. A technician 10 (illustrated in FIG. 1) generates the set of training data using different VAV appliances 50, if possible at different locations and at different times, with different values of the K factor originally configured at the VAV appliance 50, etc. It is more efficient to have the training server 300 represented in FIG. 3 automatically collect the inputs and output of each training set used for generating the predictive model. However, if some data cannot be automatically collected, the technician 10 of FIG. 1 manually collects these data and uses a user interface of the training server 300 to feed the manually collected data to the neural network training engine 312.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement training, etc.

During the operational phase implemented by the method 400, the neural network inference engine 112 uses the predictive model (including the values of the weights) determined during the training phase to infer an output (the inferred airflow of step 430) based on inputs (the measured airflow determined at step 410, the plurality of consecutive temperature measurements determined at step 415, etc.), as is well known in the art.

Direct Inference of the K Factor

Figure 7:
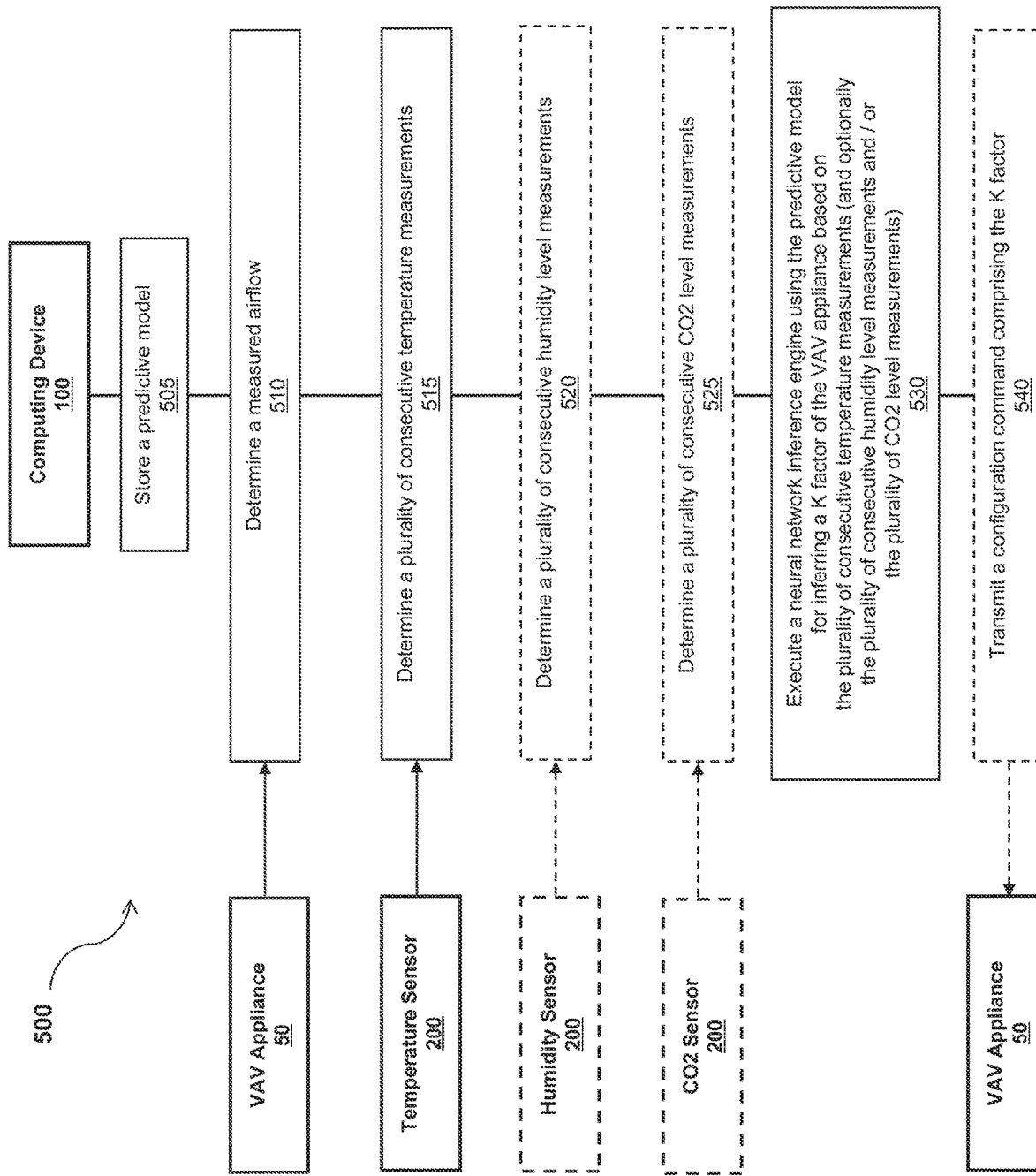
FIG. 7 represents an alternative method implemented by the computing device of FIG. 2 for inferring a K factor of a controlled appliance operating in an area of a building.

Referring now concurrently to FIGS. 2, 3, 4A, 4B, 7 and 8, a method 500 for inferring a K factor of a VAV appliance operating in an area of a building is illustrated in FIG. 7.

Steps 505 to 525 of the method 500 are identical to corresponding steps 405 to 425 of the method 400. However, the predictive model stored at step 505 and used at step 530 is different from the predictive model used by the method 400.

At step 530, a K factor of the VAV appliance 50 is inferred by the neural network inference engine 112 (instead of inferring an airflow of the VAV appliance 50). The inputs are the same as for step 430 of the method 400. The inputs include: the measured airflow (determined at step 510), the plurality of consecutive temperature measurements (determined at step 515), optionally the plurality of consecutive humidity level measurements (determined at step 520), and optionally the plurality of consecutive CO2 level measurements (determined at step 525).

Optional step 540 is identical to corresponding step 440 of the method 400.

Figure 8:
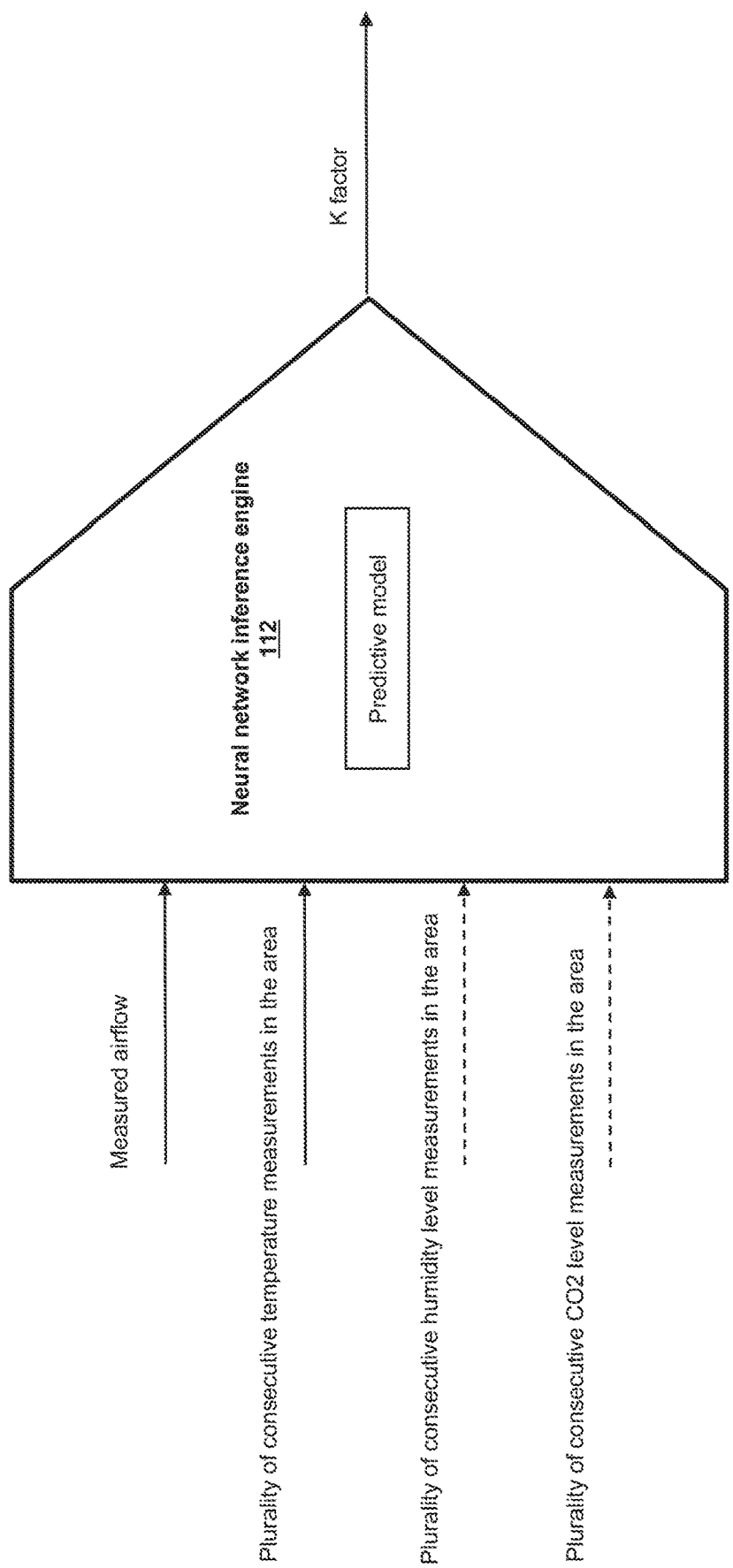
FIG. 8 is a schematic representation of a neural network inference engine executed by the computing device of FIG. 2 according to the method of FIG. 7.

FIG. 8 illustrates the inputs and the outputs used by the neural network inference engine 112 when performing step 530.

The determination of the predictive model during the training phase for the method 500 is similar to the previously described determination of the predictive model for the method 400, with the exception of the training outputs.

The neural network training engine 312 is trained with a plurality of data sets, each data set comprising training inputs and a corresponding training output. The training inputs are the same as those used for the method 400. Each set of training inputs comprises an airflow measured by the sensor 55/VAV appliance 50, a plurality of consecutive temperature measurements, optionally a plurality of consecutive humidity level measurements, and optionally a plurality of consecutive CO2 level measurements. Additional optional training inputs such as an external temperature and/or an external humidity level (measured outside the building) may be used.

Each corresponding output consists of a calculated K factor. The calculated K factor is calculated with equation (5) using the airflow measured by the sensor 55/VAV appliance 50, a real airflow of the VAV appliance 50 determined by a technician as illustrated in FIG. 1, and a value of the K factor currently configured at the VAV appliance 50.

The method 400 is easier to implement during the training phase, since it does not need to calculate the calculated K factor with equation (5) for generating the predictive model, by contrast to the method 500 which needs the calculated K factor for generating the predictive model. The method 500 is easier to implement during the operational phase, since the K factor is directly inferred using the predictive model at step 530, by contrast to the method 400 which includes the additional step 435 for calculating the K factor.

The methods 400 and 500 also use distinct predictive models. It shall be determined experimentally which one of the two models is more accurate. One of the two predictive models may also use less input parameters, making the predictive model simpler and easier to generate.

The methods 400 and 500 are not limited to a VAV appliance, but can be generalized to any type of HVAC appliance having a sensor for measuring an airflow and a configurable K factor. Furthermore, steps 405 to 430 of the method 400 may also be generalized to other types of appliance having a sensor for measuring an airflow, where the measurements provided by the sensor need to be calibrated.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for calculating a new K factor of a Variable Air Volume (VAV) appliance operating in an area of a building, the method comprising:

storing a predictive model in a memory of a computing device;

determining by a processing unit of the computing device a measured airflow of the VAV appliance;

determining by the processing unit of the computing device a plurality of consecutive temperature measurements in the area;

executing by the processing unit of the computing device a neural network inference engine using the predictive model for inferring an inferred airflow based on inputs, the inputs comprising the measured airflow and the plurality of consecutive temperature measurements;

calculating by the processing unit of the computing device the new K factor $K_1$ of the VAV appliance based on the inferred airflow $Q_i$, the measured airflow $Q_m$ and a K factor $K_0$ currently configured at the VAV appliance using the equation $$K_1 = K_0 * \left(\frac{Qm}{Qi}\right)^2.$$

reconfiguring the VAV appliance with the new K factor $K_1$; and using the new K factor $K_1$ and a differential pressure measured by a differential pressure sensor of the VAV appliance for auto-regulating operations of the VAV appliance.

2. The method of claim 1, further comprising transmitting by the processing unit of the computing device a configuration command comprising the new K factor $K_1$ to the VAV appliance, receiving the configuration command by the VAV appliance and using by the VAV appliance the configuration command for automatically reconfiguring the VAV appliance with the new K factor $K_1$.

3. The method of claim 1, wherein determining by the processing unit of the computing device a measured airflow of the VAV appliance consists in receiving the measured airflow from the VAV appliance.

4. The method of claim 1, wherein the inputs further comprise at least one of the following: a plurality of consecutive humidity level measurements in the area determined by the processing unit of the computing device, a plurality of consecutive carbon dioxide (CO2) level measurements in the area determined by the processing unit of the computing device, and a combination thereof.

5. The method of claim 1, wherein the predictive model comprises weights used by the neural network inference engine for inferring the inferred airflow based on the inputs.

6. The method of claim 1, further comprising displaying by the processing unit of the computing device the new K factor $K_1$ on a display of the computing device; and reconfiguring by a user the VAV appliance with the new K factor $K_1$ displayed on the display of the computing device.

7. A non-transitory computer readable medium comprising instructions executable by a processing unit of a computing device, the execution of the instructions by the processing unit of the computing device providing for calculating a new K factor of a Variable Air Volume (VAV) appliance operating in an area of a building by:

storing a predictive model in a memory of the computing device;

determining by the processing unit of the computing device a measured airflow of the VAV appliance;

determining by the processing unit of the computing device a plurality of consecutive temperature measurements in the area;

executing by the processing unit of the computing device a neural network inference engine using the predictive model for inferring an inferred airflow based on inputs, the inputs comprising the measured airflow and the plurality of consecutive temperature measurements;

calculating by the processing unit of the computing device the new K factor $K_1$ of the VAV appliance based on the inferred airflow $Q_i$, the measured airflow $Q_m$ and a K factor $K_0$ currently configured at the VAV appliance using the equation $$K_1 = K_0 * \left(\frac{Qm}{Qi}\right)^2.$$

and transmitting by the processing unit of the computing device a configuration command comprising the new K factor $K_1$ to the VAV appliance for automatically reconfiguring the VAV appliance with the new K factor $K_1$, the new K factor $K_1$ being used by the VAV appliance for auto-regulating operations of the VAV appliance.

8. The non-transitory computer readable medium of claim 7, wherein the inputs further comprise at least one of the following: a plurality of consecutive humidity level measurements in the area determined by the processing unit of the computing device, a plurality of consecutive carbon dioxide (CO2) level measurements in the area determined by the processing unit of the computing device, and a combination thereof.

9. The non-transitory computer readable medium of claim 7, wherein the predictive model comprises weights used by the neural network inference engine for inferring the inferred airflow based on the inputs.

10. The non-transitory computer readable medium of claim 7, wherein the execution of the instructions by the processing unit of the computing device further effects: displaying by the processing unit of the computing device the new K factor $K_1$ on a display of the computing device.

11. A computing device for calculating a new K factor of a Variable Air Volume (VAV) appliance operating in an area of a building, the computing device comprising:

memory for storing a predictive model; and a processing unit for:

determining a measured airflow of the VAV appliance;

determining a plurality of consecutive temperature measurements in the area;

executing a neural network inference engine using the predictive model for inferring an inferred airflow based on inputs, the inputs comprising the measured airflow and the plurality of consecutive temperature measurements;

calculating the new K factor $K_1$ of the VAV appliance based on the inferred airflow $Q_i$, the measured airflow $Q_m$ and a K factor $K_0$ currently configured at the VAV appliance using the equation $$K_1 = K_0 * \left(\frac{Qm}{Qi}\right)^2.$$

and transmitting by the processing unit of the computing device a configuration command comprising the new K factor $K_1$ to the VAV appliance for automatically reconfiguring the VAV appliance with the new K factor $K_1$, the new K factor $K_1$ being used by the VAV appliance for auto-regulating operations of the VAV appliance.

12. The computing device of claim 11, wherein determining by the processing unit a measured airflow of the VAV appliance consists in receiving the measured airflow from the VAV appliance via a communication interface of the computing device.

13. The computing device of claim 11, wherein the inputs further comprise at least one of the following: a plurality of consecutive humidity level measurements in the area determined by the processing unit, a plurality of consecutive carbon dioxide (CO2) level measurements in the area determined by the processing unit, and a combination thereof.

14. The computing device of claim 11, wherein the predictive model comprises weights used by the neural network inference engine for inferring the inferred airflow based on the inputs.

15. The computing device of claim 11, wherein the processing unit further displays the new K factor $K_1$ on a display of the computing device.

* * * * *